US009156377B2

(12) United States Patent
Mixon et al.

(10) Patent No.: US 9,156,377 B2
(45) Date of Patent: Oct. 13, 2015

(54) POWER SEAT WITH COMPLETE MANUAL WALK-IN SYSTEM

(71) Applicant: AISIN TECHNICAL CENTER OF AMERICA, INC., Plymouth, MI (US)

(72) Inventors: Michael Mixon, Plymouth, MI (US); Ryosuke Mizuno, Novi, MI (US)

(73) Assignee: AISIN TECHNICAL CENTER OF AMERICA, INC., Plymouth, MI (US)

( * ) Notice: Subject to any disclaimer, the term of this patent is extended or adjusted under 35 U.S.C. 154(b) by 227 days.

(21) Appl. No.: 13/948,934

(22) Filed: Jul. 23, 2013

(65) Prior Publication Data

US 2014/0339871 A1    Nov. 20, 2014

Related U.S. Application Data

(60) Provisional application No. 61/823,174, filed on May 14, 2013.

(51) Int. Cl.
*B60N 2/12* (2006.01)
*B60N 2/02* (2006.01)

(52) U.S. Cl.
CPC ............ *B60N 2/12* (2013.01); *B60N 2/0232* (2013.01)

(58) Field of Classification Search
CPC ............................. B60N 2/12; B60N 2/0232
USPC ............................................ 297/341, 344.1
See application file for complete search history.

(56) References Cited

U.S. PATENT DOCUMENTS

| 5,516,071 | A | 5/1996 | Miyauchi | |
|---|---|---|---|---|
| 6,460,934 | B1 * | 10/2002 | Langer et al. | 297/344.1 |
| 7,500,719 | B2 * | 3/2009 | Kojima | 297/362 |
| 7,976,103 | B2 * | 7/2011 | Gamache et al. | 297/341 |
| 8,777,316 | B2 * | 7/2014 | Shanmugam et al. | 297/341 |
| 2003/0080598 | A1 | 5/2003 | Becker et al. | |
| 2005/0104433 | A1 | 5/2005 | Ganot et al. | |

FOREIGN PATENT DOCUMENTS

| DE | 10 2008 017021 A1 | 1/2009 |
|---|---|---|
| FR | 2 831 115 A1 | 4/2003 |
| FR | 2 850 913 A1 | 8/2004 |
| JP | 5-1565 U | 1/1993 |
| JP | 05016714 A * | 1/1993 |
| JP | 5-49463 U | 6/1993 |
| JP | 2010-247575 A | 11/2010 |

OTHER PUBLICATIONS

Extended European Search Report issued on Jan. 12, 2014 in the corresponding European Application No. 14172290.0.
Office Action issued Mar. 24, 2015 in Japanese Patent Application No. 2014-114919 (with English language translation).
U.S. Appl. No. 13/916,222, filed Jun. 12, 2013, Mizuno, et al.

* cited by examiner

*Primary Examiner* — Anthony D Barfield
(74) *Attorney, Agent, or Firm* — Oblon, McClelland, Maier & Neustadt, L.L.P.

(57) ABSTRACT

A seat including a power recliner, a power slide mechanism, a seat back; and a walk-in lever that releases the power recliner so that the seat back may rotate. The seat configured so that rotation of the seat back after being released by the walk-in lever in a forward direction by a predetermined amount releases the power slide mechanism so that the seat may slide in a fore-aft direction.

6 Claims, 8 Drawing Sheets

POWER SEAT WITH COMPLETE MANUAL WALK-IN SYSTEM

CROSS REFERENCE TO RELATED APPLICATIONS

The present application is a non-provisional application of and claims priority to U.S. provisional application 61/823,174 filed on May 14, 2013, the entirety of which is incorporated by reference.

BACKGROUND OF THE INVENTION

1. Field of the Invention

Exemplary aspects of the present invention relate to a manually operated walk-in system of a powered vehicle seat.

2. Description of the Related Art

Seats of a vehicle such as an automobile may be provided with a reclining mechanism that allows the seat back to pivot at a base portion thereof. These seats may also be provided with a sliding mechanism that allows the seat to travel in the fore-aft direction of the vehicle. Both the reclining mechanism and the sliding mechanism may be operated using individual manual levers, typically located on the vehicle seat. Also the reclining mechanism and the sliding mechanism may be replaced by a powered actuator that performs the sliding and reclining functions without additional effort from the user. Seats equipped with these features are typically called power seats or power assisted seats.

Seats may also include a walk-in feature that assists the egress and ingress of the vehicle. Typically, the walk-in feature allows one to more easily enter a space behind the seat by moving the seat forward and by rotating the seatback forward. Therefore, the walk-in feature has a recliner function and/or a slide function. These walk-in functions can be powered or manually actuated.

SUMMARY OF THE INVENTION

A seat including a power recliner, a power slide mechanism, a seat back; and a walk-in lever that releases the power recliner so that the seat back may rotate. The seat configured so that rotation of the seat back after being released by the walk-in lever in a forward direction by a predetermined amount releases the power slide mechanism so that the seat may slide in a fore-aft direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF THE PREFERRED EMBODIMENTS

Referring now to the drawings, wherein like reference numerals designate identical or corresponding parts throughout the several views. Further, as used herein, the words "a," "an" and the like generally carry a meaning of "one or more," unless stated otherwise.

The figures depict various aspects of a power seat with a manual walk-in feature. (also referred to as a quick walk-in). Here a vehicle refers to a land vehicle exemplified by an automobile. However, the present disclosure is also applicable to any similar type vehicle, such as but not limited to, a sport utility vehicle, a pickup truck, a commercial vehicle, a boat an airplane or the like.

Figure 1:
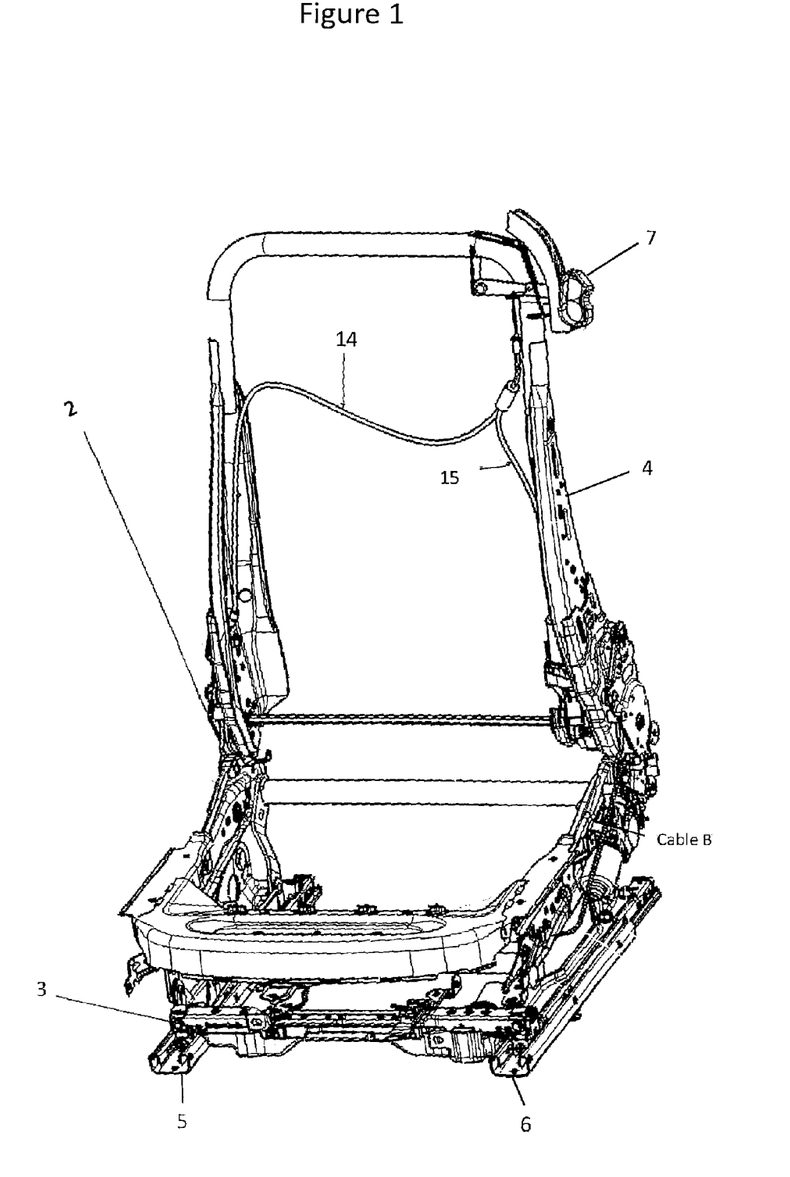
FIG. 1 is a view of an embodiment of the present disclosure.

FIG. 1 illustrates a seat 1 including a frame 11 provided with power recliners 2 on each side of the seat 1 and a power seat slide 3 located at the bottom of the frame 11. The power recliners 2 rotate the seat back in around an axis in a generally fore-aft direction. The power seat slide 3 moves the seat in the fore-aft direction by sliding the seat 1 on the respective inner rail 5 and outer rail 6.

Figure 2:
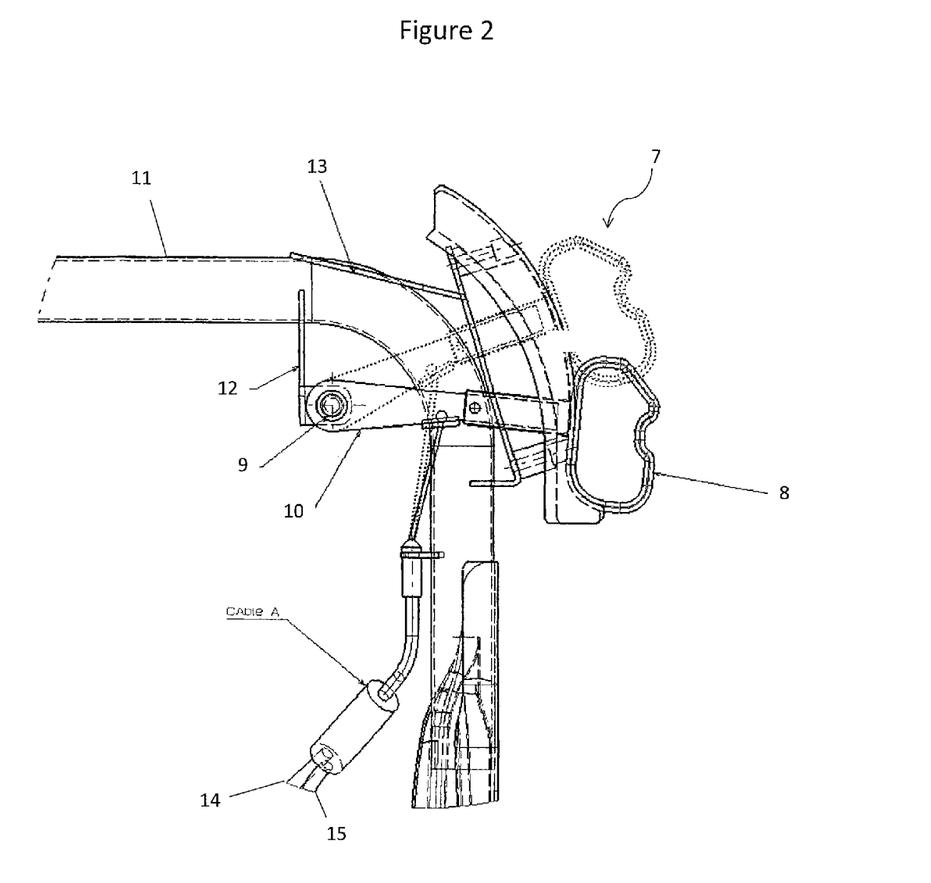
FIG. 2 is a view of an embodiment of the present disclosure.
Figure 3:
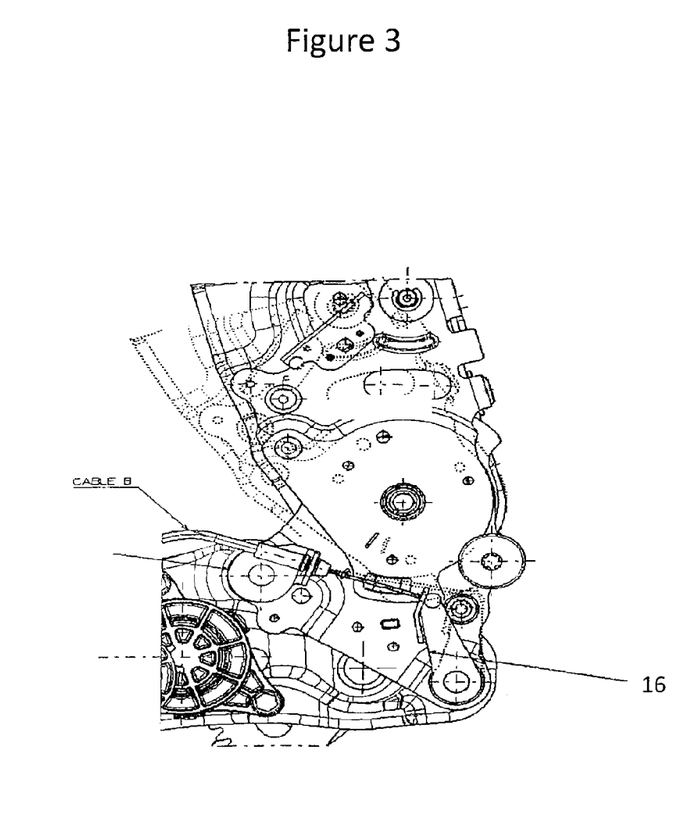
FIG. 3 is a view of an embodiment of the present disclosure.

FIG. 1 also illustrates a walk-in lever 7 found at a top portion of the seat frame 11. The walk-in lever 7 here is illustrated in a shoulder area of the seat 1. FIG. 2 illustrates the walk-in lever 7 in more detail. The walk-in lever 7 includes a handle 8 that is moved by a user. The handle 8 is connected to an orbital riveting 9 by a lever 10, so that the handle 8 pivots about the orbital riveting 9.

Cable A is attached to the lever 10. When the handle 8 is operated, the cable A is moved in response. FIG. 2 shows the movement of the handle 8 in dashed lines and the cable A is moved upward in this Figure. Cable A is an example of a connection device, but other means such as a linkage, lever, chain, or the like may also be used.

The lever 10 and the orbital riveting 9 are supported by a lever plate 12 attached to the frame. Similarly, the handle 8 is supported by a handle plate 13 which is also attached to the frame 11.

As shown in FIGS. 1 and 2, cable A includes a first leg 14 and a second leg 15. The respective legs 14 and 15 extend to the inner and outer power recliners 2. The legs 14 and 15 of the cable A are arranged so that the movement of the handle 8 will effect actuation simultaneously at each of the inner and outer power recliners 2.

When the cable A is pulled a sufficient amount by the walk-in handle 8, the power recliner 2 releases its manual walk-in system. Thereafter, the seat back 4 is able to rotate forward to operate a walk-in procedure. A spring bias is provided which urges the seat back 4 forward once the manual walk-in system is released by the movement of the cable A.

As the seat back 4 rotates forward after the manual recline walk-in is released, a cable B wire pull lever 16 is moved relative to the seat back 4. The wire pull lever 16 can be part of either or both of the inner and outer power recliners 2. The cable B wire pull lever 16 is attached a cable B which is attached to a respective seat track at a distal end thereof. Cable B is an example of a connection device, but other means such as a linkage, lever, chain, or the like may also be used.

Figure 4:
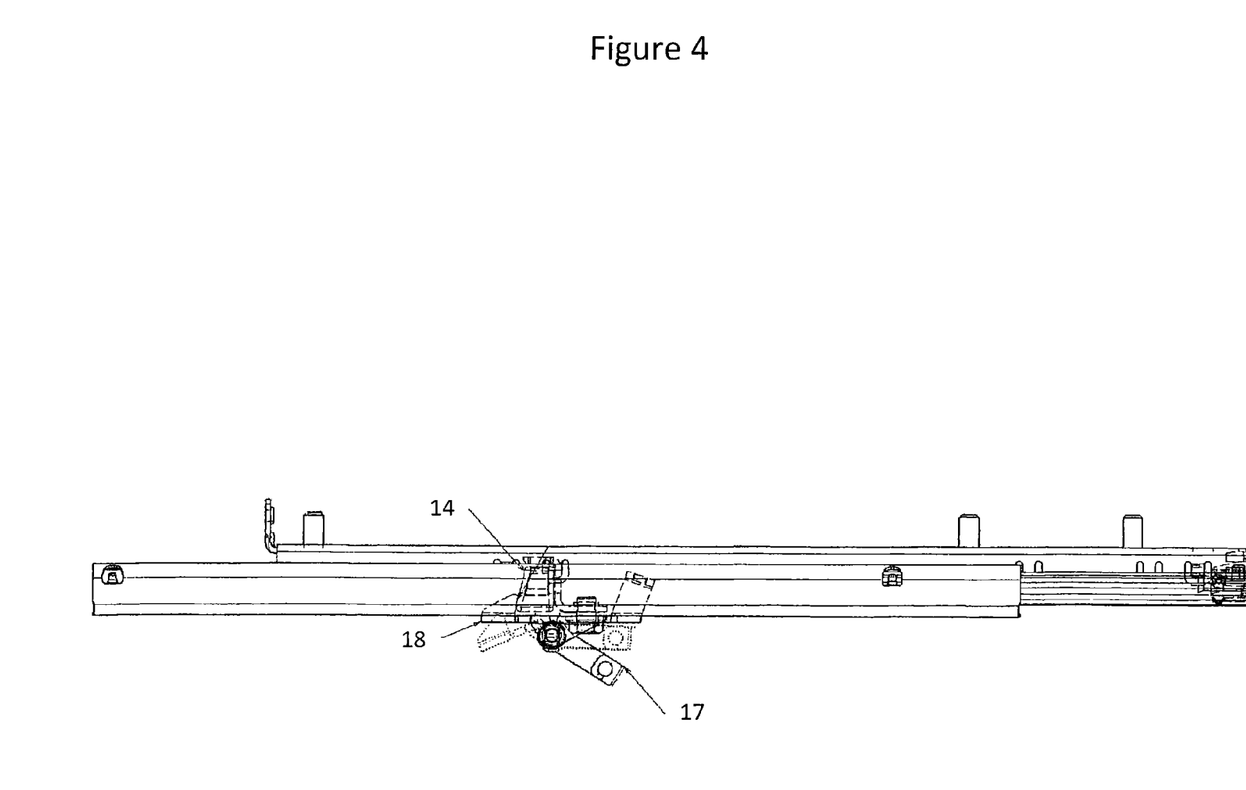
FIG. 4 is a view of an embodiment of the present disclosure.
Figure 8:
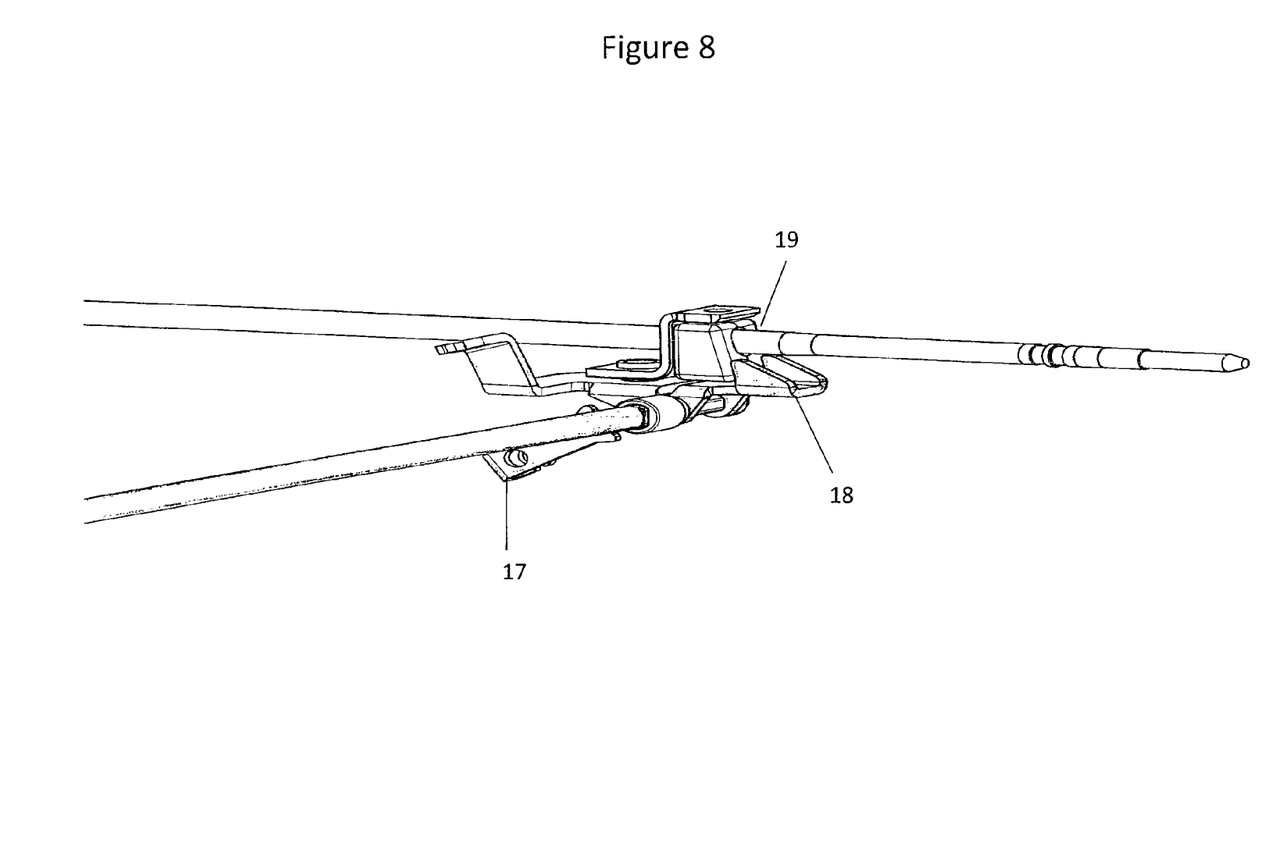
FIG. 8 is a view of an embodiment of the present disclosure.

Shown in FIG. 4, at the track, the cable B is connected to a wire slide wire clamp 17. The wire clamp 17 is attached to a lock lever 18, such that the movement of the wire clamp 17 causes the lock lever 18 to relatively rotate. The lock lever 18 abuts a lead screw nut 19 which is provided to a rail. The lock lever 18 may include two generally triangular portions as shown in FIG. 8. The lock lever 18 and the lead screw nut 19 are arranged so that the interface between the two is at an angle relative to the tracks. This angle can be formed by a combination of the shape of the lock lever 18 and the lead screw nut 19 or either part, individually. FIGS. 4 and 8 illustrate that both the lock lever 18 and the lead screw nut 19 are inclined to create the angle at the interface. This angle directs the force on an upward angle so that the lock lever 18 does not inadvertently open unless the lock lever 18 is rotated out of the way.

Movement of the cable B pulls the wire clamp 17 upward as shown in FIG. 4. As shown in FIG. 4, the movement of the lock lever 18 and the wire clamp 17 is shown in a dashed line. When the movement of the cable B moves the wire clamp 17 upward, the lock lever 18 rotates downward. If the wire clamp 17 is moved a sufficient distance, then the lock lever 18 rotates down and out of contact with the lead screw nut 19, thereby allowing the seat track to move forward.

Figure 5:
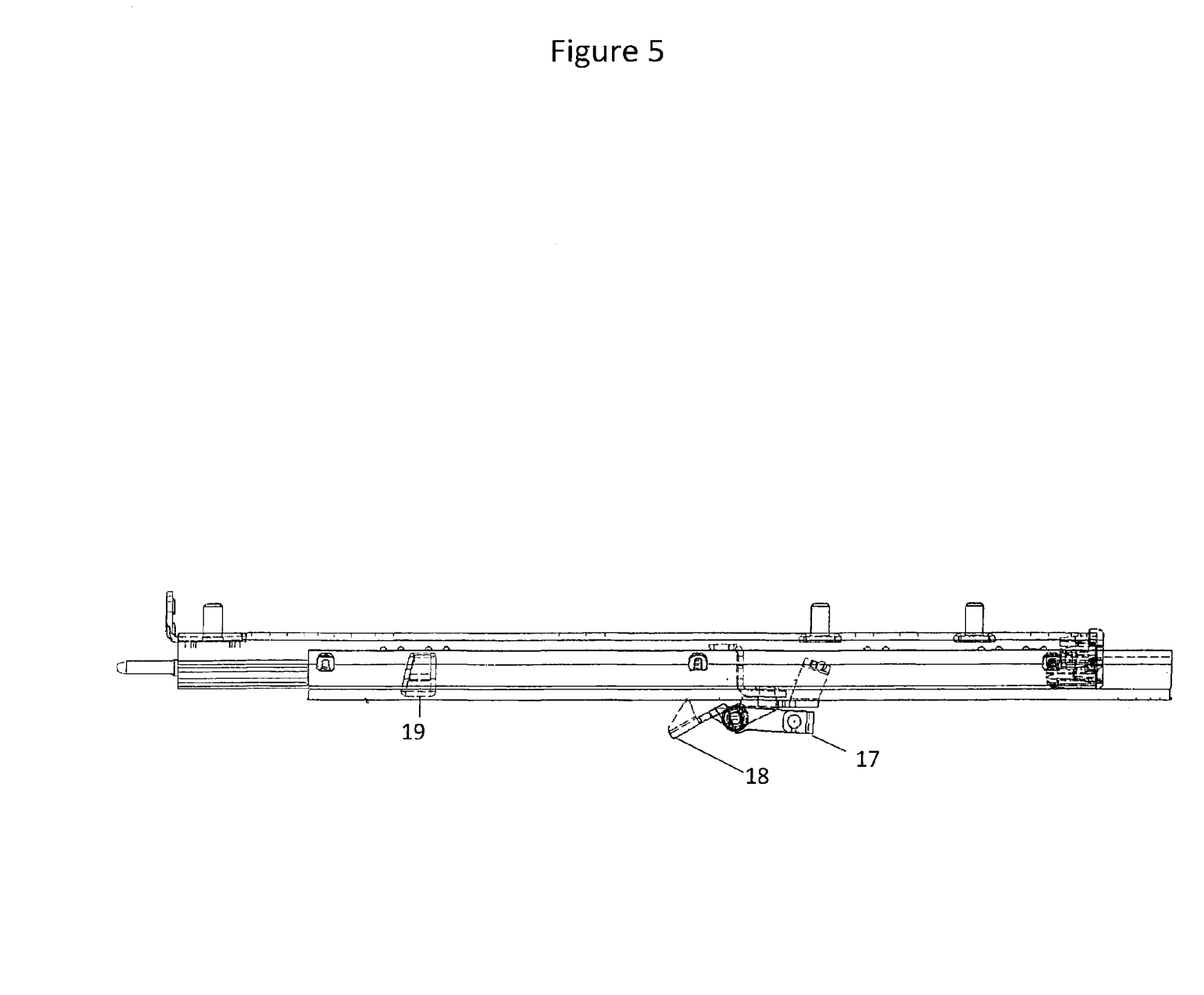
FIG. 5 is a view of an embodiment of the present disclosure.

FIG. 5 illustrates the movement of the seat track in the forward direction after the lock lever 18 releases the lead screw nut 19. The lower rail, where the lead screw nut 19 slides, is flat with no caulking pins which allows the track to slide to a forward most position.

With the seat 1 at its forward most slide position and the seat back 4 rotated to its forward most position, the walk-in operation is completed. The reverse of the walk-in will be now described.

Movement of the seat back 4 rearward causes the reverse of the movement described above. In particular, the movement of the seat back 4 rearward causes the cable B wire pull lever 16 to move in the opposite direction. This causes the cable B to move downward toward the original position shown in FIG. 4. As the seat back 4 approaches a neutral upright position the lock lever 18 returns to the locked position due to a bias force.

Figure 6:
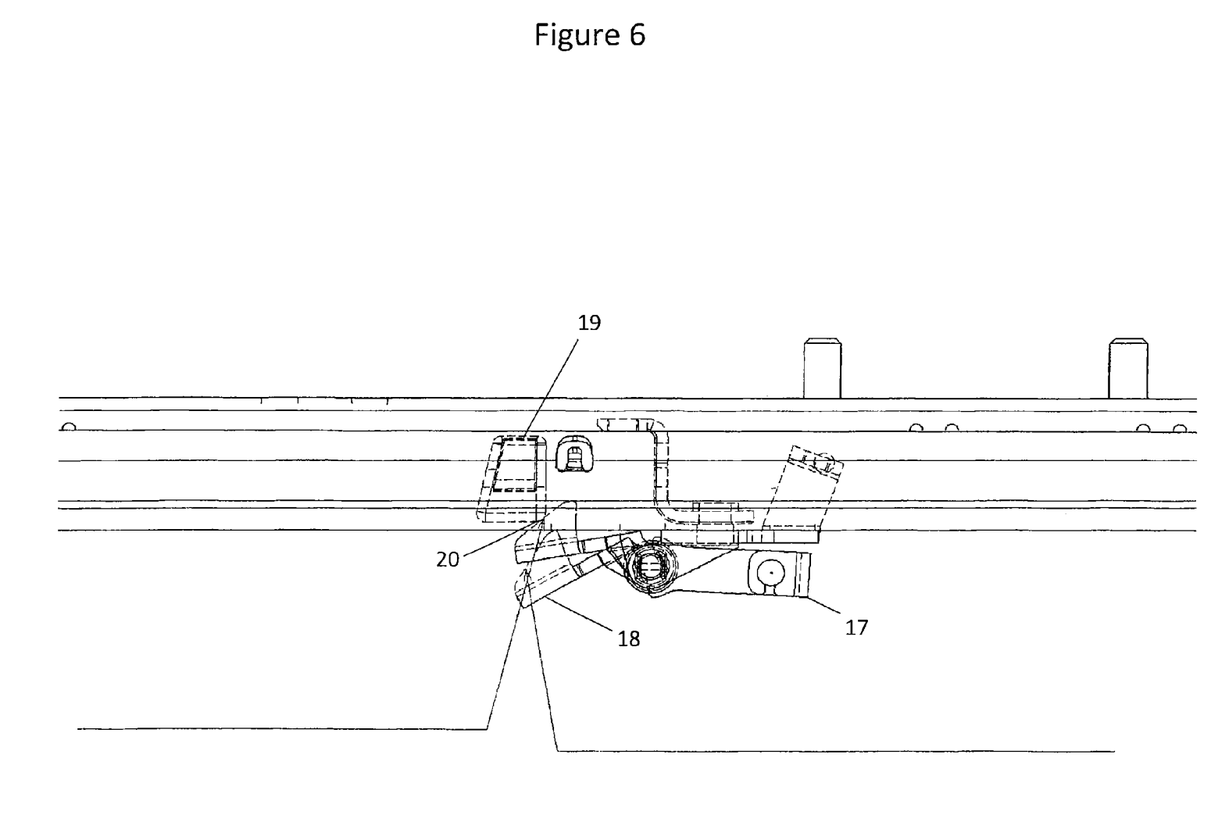
FIG. 6 is a view of an embodiment of the present disclosure.

FIG. 6 illustrates the track sliding rearward and the lead screw nut 19 is approaching the lock lever 18. The lock lever has an inclined front portion 20 which allows the lead screw nut 19 to slide over the lock lever 18, should the lock lever 18 be in the locked position due to the movement of the seat back 4. Here, the lead screw nut 19 would force the lock lever 18 down temporarily against a biasing force that holds the lock lever 18 up in the locked position. Once the lead screw nut 19 has cleared the lock lever 18, the lock lever 18 would return to the locked position and secure the lead screw nut 19. Once the lead screw nut 19 is locked by the lock lever 18 and the seat back 4 is in the neutral upright position, then the return walk-in procedure is complete.

Figure 7:
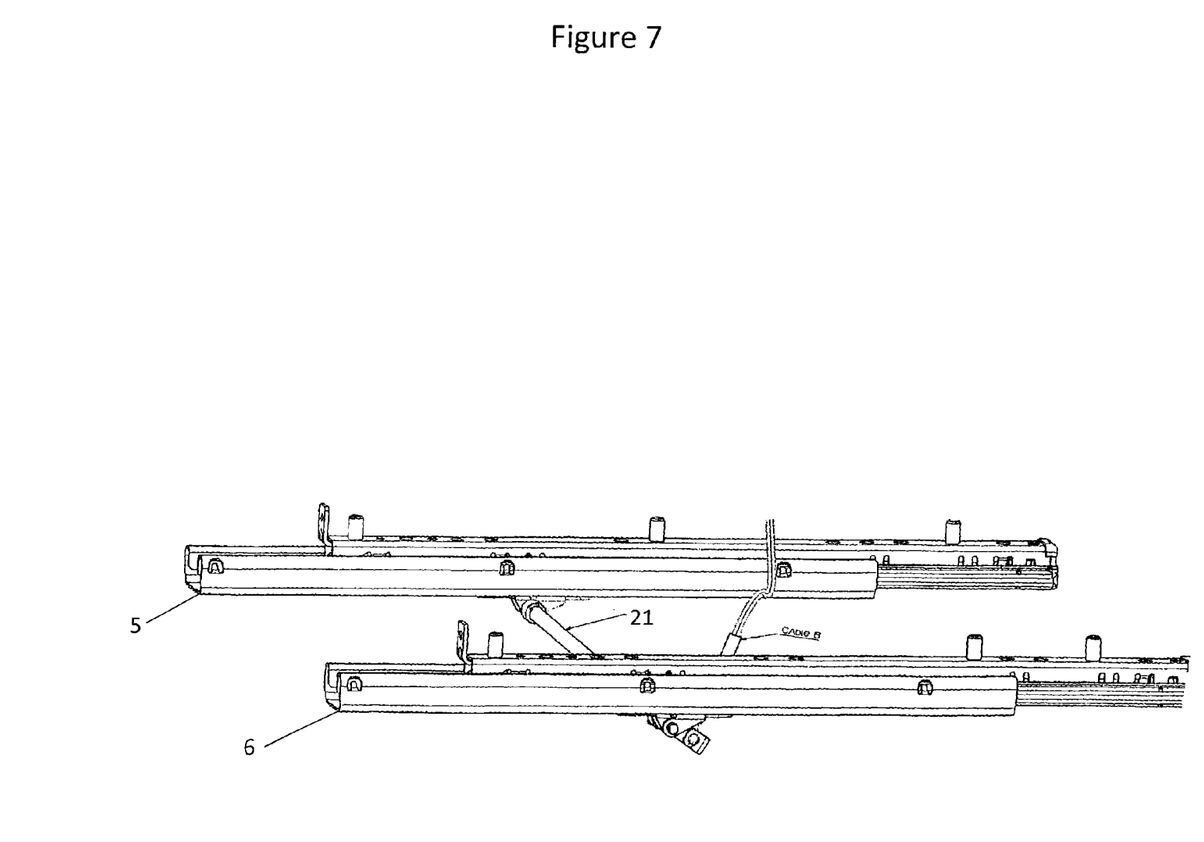
FIG. 7 is a view of an embodiment of the present disclosure.

The above walk-in procedure was described with regard to a single lock lever 18 and lead screw nut 19. FIG. 7 shows that both the inner and outer seat tracks (5 and 6) may be have the same components including lock levers and lead screw nuts. A connecting rod 21 is provided between the respective sides so that the movement of one side also actuates the opposite side. FIG. 8 also provides a view of the one of the assemblies and the connecting rod 21.

Accordingly, the mechanism described in detail above can provide a quick, manual walk-in system for a power seat with a powered slide and recliner function. During the walk-in the seat is able to slide to a forward-most position giving entry to the rear seat as large as possible. The mechanism uses a single manual walk-in lever to release the recliner and then both seat tracks at the same time. Further, an angle is provided between the lead screw nut and the lock lever to avoid inadvertent unlocking.

The invention claimed is:

1. A seat including a power recliner and a power slide mechanism, comprising:
   a seat back;
   a walk-in lever that releases the power recliner so that the seat back may rotate;
   a lead screw nut;
   a lock lever that rotates in response to movement of the seat back, the lock lever including a rear portion that contacts the lead screw nut to lock the lead screw nut,
   wherein rotation of the seat back in a forward direction by a predetermined amount rotates the lock lever so that rear portion releases the lead screw nut so that the seat may slide in a fore-aft direction.

2. The seat of claim 1, further comprising:
   a first connection device between the walk-in lever and the power recliner that releases the power recliner, and
   a second connection device between the seat back and the power slide mechanism that releases the power slide mechanism.

3. The seat of claim 2, further comprising:
   the lock lever rotates in response to movement of the second connection device.

4. The seat of claim 1, wherein the lock lever and the lead screw nut are configured so that an angle is formed at interfaces between the lock lever and the lead screw nut to prevent the lead screw nut from moving when the lock lever is in contact.

5. The seat of claim 1, wherein when the rear portion of the lock lever releases the lead screw nut, the lead screw nut moves relative to the lock lever in the fore-aft direction.

6. The seat of claim 1, wherein the rear portion of the lock lever contacts a front portion of the lead screw nut to lock the lead screw nut, and
   the lock lever includes a front inclined portion configured to contact a rear portion of the lead screw nut when the lead screw nut moves in an aft direction.

* * * * *